United States Patent
Li et al.

(10) Patent No.: US 9,105,927 B2
(45) Date of Patent: Aug. 11, 2015

(54) METHOD FOR PREPARING CATHODE ACTIVE MATERIAL OF LITHIUM BATTERY

(75) Inventors: Ya-Dong Li, Beijing (CN); Xiao-Ling Xiao, Beijing (CN); Jun Lu, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 818 days.

(21) Appl. No.: 12/878,381

(22) Filed: Sep. 9, 2010

(65) Prior Publication Data

US 2011/0193012 A1    Aug. 11, 2011

(30) Foreign Application Priority Data

Feb. 8, 2010    (CN) .......................... 2010 1 0111812

(51) Int. Cl.
H01M 4/88        (2006.01)
H01M 4/13        (2010.01)
H01M 4/505       (2010.01)
C01G 45/12       (2006.01)

(52) U.S. Cl.
CPC ........... *H01M 4/505* (2013.01); *C01G 45/1242* (2013.01); *C01P 2002/32* (2013.01); *C01P 2002/72* (2013.01); *C01P 2004/03* (2013.01); *C01P 2004/04* (2013.01); *C01P 2004/32* (2013.01); *C01P 2004/34* (2013.01); *C01P 2004/61* (2013.01); *Y02E 60/122* (2013.01)

(58) Field of Classification Search
USPC ................. 429/221, 223, 224, 218, 231, 322; 252/182.1; 264/319; 423/599
See application file for complete search history.

(56) References Cited

U.S. PATENT DOCUMENTS

| | | | |
|---|---|---|---|
| 5,866,279 A | 2/1999 | Wada et al. | |
| 6,348,182 B1 | 2/2002 | Lu et al. | |
| 6,706,443 B1 * | 3/2004 | Krampitz et al. | 429/224 |
| 2003/0124423 A1 * | 7/2003 | Sasaki et al. | 429/221 |

FOREIGN PATENT DOCUMENTS

| | | | |
|---|---|---|---|
| CN | 1258643 | | 7/2000 |
| CN | 1264233 C | | 7/2006 |
| JP | 07-069640 | * | 3/1995 |
| JP | 10-152326 | * | 6/1998 |
| JP | 10152326 | | 6/1998 |
| TW | 446685 | | 7/2001 |

OTHER PUBLICATIONS

Fei et al., Controlled preparation of MnO2 Hierarchical hollow nanostructures and their application in water treatment, Adv. Mater. 2008, 20, 452-456.*

Fei et al., Controlled preparation of MnO2 Hierarchical Hollow Nanostructure and their application in water treatment, 2008, Adv. Mater. 20, 452-456.*

Jinbo Fei et al., "Controlled Preparation of MnO2 Hierarchical Hollow Nanostructures and Their Application in Water Treatment", Advanced Materials, pp. 452-456, 2008.

Jiayan Luo et al., "LiMn2O4 hollow nanosphere electrode material with excellent cycling reversibility and rate capability", Electrochemistry Communications, pp. 1404-1409, 2007.

Su Hai-feng et al., Morphology Control in Preparation Process of Spherical Manganese Carbonate Particles, The Chinese Journal of Process Engineering, Apr. 2008, vol. 8, No. 2, pp. 280-284.

Wei Zhang, Zhi-cheng Zhang, Preparation of Manganese Oxide Hollow Spheres Using pH-responsive Microgels as Templates, Chinese Journal of Chemical Physics, Jun. 27, 2009, vol. 22, No. 3, pp. 327-332.

* cited by examiner

*Primary Examiner* — Monique Peets
(74) *Attorney, Agent, or Firm* — Novak Druce Connolly Bove + Quigg LLP (57) ABSTRACT

A method for preparing a spinel type lithium manganese oxide cathode active material, includes providing a number of manganese dioxide hollow spheres and a lithium source powder, mixing the manganese dioxide hollow spheres and the lithium source powder in a liquid medium to achieve a mixture, drying the mixture to remove the liquid medium to achieve a precursor, and sintering the precursor at a sintering temperature of about 600° C. to about 800° C. for about 3 hours to about 10 hours, to achieve a number of spinel type lithium manganese oxide hollow spheres.

11 Claims, 8 Drawing Sheets

METHOD FOR PREPARING CATHODE ACTIVE MATERIAL OF LITHIUM BATTERY

CROSS-REFERENCE TO RELATED APPLICATIONS

This application claims all benefits accruing under 35 U.S.C. §119 from China Patent Application No. 201010111812.5, filed on Feb. 8, 2010 in the China Intellectual Property Office, the contents of which are hereby incorporated by reference.

BACKGROUND

1. Technical Field

The present disclosure relates to a method for preparing cathode active materials of lithium batteries and, particularly, to a method for preparing a spinel type lithium manganese oxide cathode active material of a lithium battery.

2. Description of Related Art

Lithium transition metal oxides are currently used as cathode active materials for lithium-ion batteries, such as spinel type lithium manganese oxide (e.g. $LiMn_2O_4$), olivine type lithium iron phosphate (e.g. $LiFePO_4$), and layered type lithium cobalt oxide (e.g. $LiCoO_2$). $LiCoO_2$ is a commonly used cathode active material in commercial lithium ion batteries, and has a stable structure and a high capacity. However, the high cost, toxicity, and limited abundance of cobalt are disadvantages of $LiCoO_2$. As a result, alternative cathode active materials have attracted much interest. One promising candidate is spinel $LiMn_2O_4$. The spinel $LiMn_2O_4$ has the advantages of low-cost, environmental friendliness, good safety, and high abundance, but has disadvantages of low tap density and poor performance at high temperature.

Chinese Patent Number CN1264233C discloses a method for preparing the spinel $LiMn_2O_4$. In the method, the spinel $LiMn_2O_4$ is formed into sphere morphology to improve the tap density and specific surface area of the spinel $LiMn_2O_4$. Further, the stability of the spinel $LiMn_2O_4$ at high temperature is improved by a surface modification method.

However, the spinel $LiMn_2O_4$ spheres still have a problem of rapidly decreasing capacity at high charge/discharge current rate, which restricts the application of the spinel $LiMn_2O_4$ in power batteries.

What is needed, therefore, is to provide a method for preparing the spinel $LiMn_2O_4$ cathode active material of lithium battery, which can be used under a relatively high charge/discharge current rate.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another", "an", or "one" embodiment in this disclosure are not necessarily to the same embodiment, and such references mean at least one.

Figure 1:
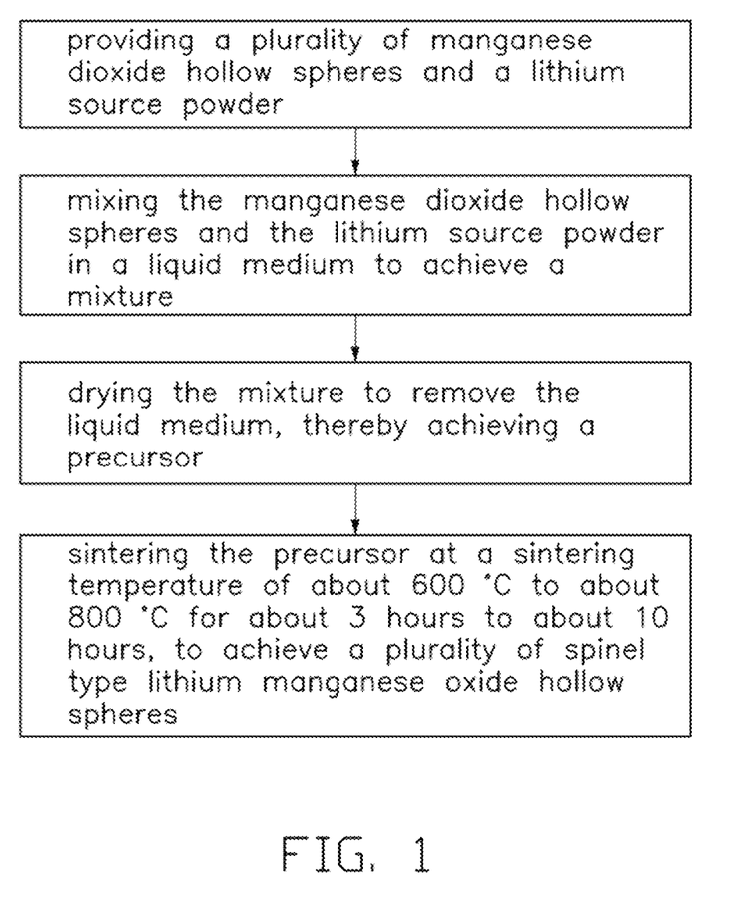
FIG. 1 is a flow chart of one embodiment of a method for preparing a spinel $LiMn_2O_4$ cathode active material of a lithium battery.
Figure 2:
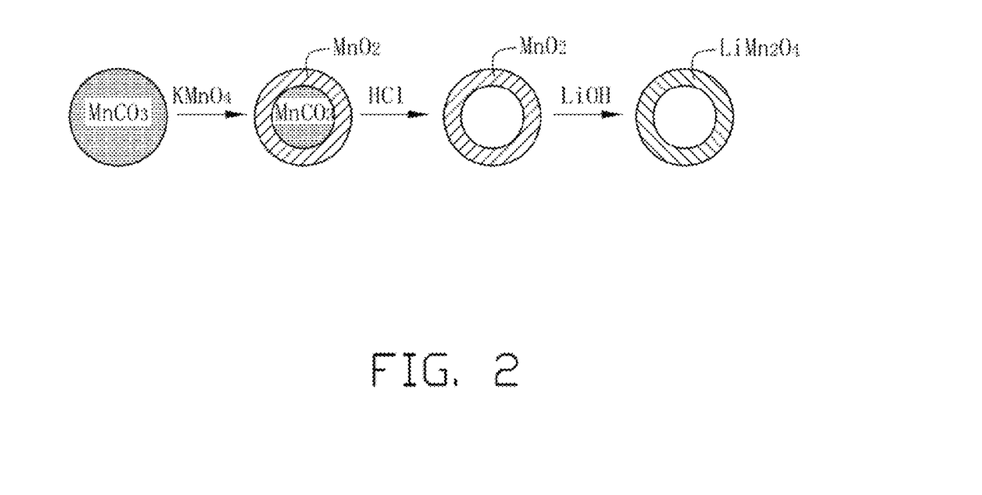
FIG. 2 is a schematic structural view of one embodiment of the method for preparing the spinel $LiMn_2O_4$ cathode active material of the lithium battery.

Referring to FIG. 1 and FIG. 2, one embodiment of a method for preparing a spinel $LiMn_2O_4$ cathode active material of lithium battery includes steps of:

S1, providing a number of manganese dioxide ($MnO_2$) hollow spheres and a lithium source powder;

S2, mixing the manganese dioxide hollow spheres and the lithium source powder in a liquid medium to achieve a mixture;

S3, drying the mixture to remove the liquid medium, thereby achieving a precursor; and S4, sintering the precursor at a sintering temperature of about 600° C. to about 800° C. for about 3 hours to about 10 hours, to achieve an amount of spinel $LiMn_2O_4$ hollow spheres.

In step S1, the $MnO_2$ hollow spheres are micron or nanometer sized. An average diameter of the $MnO_2$ hollow spheres can be less than or equal to 10 microns.

The $MnO_2$ hollow spheres can be synthesized by a method including steps of:

S11, providing an amount of manganese carbonate ($MnCO_3$) powder;

S12 dispersing the manganese carbonate powder into water to form a manganese carbonate water solution;

S13, introducing a potassium permanganate ($KMnO_4$) solution into the manganese carbonate water solution during a stirring of the manganese carbonate water solution to form a reaction product; and S14, adding a dilute acid into the reaction product.

In step S11, the $MnCO_3$ powder can have morphology of solid spheres. The $MnCO_3$ solid spheres are micron or nanometer sized. That is, the $MnCO_3$ solid spheres can be microspheres or nanospheres. An average diameter of the $MnCO_3$ solid spheres can be less than or equal to about 10 microns. The $MnCO_3$ solid spheres can be synthesized by a liquid phase coprecipitation (CPT) method including steps of: dissolving a manganese salt in a solvent to form a manganese salt solution; introducing carbonate ions into the manganese salt solution and stirring the manganese salt solution to precipitate the manganese carbonate; and filtrating the manganese carbonate. More specifically, manganese carbonate precipitate can be achieved by introducing water dissolvable carbonate salt, carbonate acid or carbon dioxide gas into a water solution of manganese salt. The manganese ions of the water solution of manganese salt can sufficiently react with the carbonate ions to form solid microsphere of $MnCO_3$ by stirring. The stirring can last for about 1 hour to about 3 hours.

In one embodiment, manganese sulfate ($MnSO_4$) is used to react with sodium carbonate ($Na_2CO_3$) in distilled water to achieve the $MnCO_3$ solid spheres with a diameter of about 1 micron to about 2 microns. Further, the achieved $MnCO_3$ solid spheres can be washed by distilled water several times to improve the purity.

In step S12, the $MnCO_3$ solid spheres can be uniformly dispersed in water by a method such as mechanical stirring, magnetic stirring, or ultrasonic. By dispersing the $MnCO_3$ solid spheres in the water, a milky colored water suspension can be achieved. The $MnCO_3$ solid spheres are suspended in the water to form the suspension.

In step S13 and step S14, the $KMnO_4$ solution can be introduced into the suspension during stirring. A molar ratio of the $MnCO_3$ to the $KMnO_4$ can be in a range from about 1:1 to about 10:1 ($1:1 \leq Mol_{MnCO3}:Mol_{KMnO4} \leq 10:1$). In one embodiment, the molar ratio of the $MnCO_3$ to the $KMnO_4$ can be in a range of $3:2 \leq Mol_{MnCO3}:Mol_{KMnO4} \leq 10:1$. The $KMnO_4$ solution can have a diluted concentration, such as from about 0.01 Mol/L to about 0.1 Mol/L. The reaction occurs between the $KMnO_4$ and the $MnCO_3$ to form $MnO_2$ precipitate. The $MnCO_3$ solid spheres is oxidated by the $KMnO_4$ from outside to inside. However, it can be controlled to only react with the superficial layer of the $MnCO_3$ solid spheres with the $KMnO_4$.

If the molar ratio of the $MnCO_3$ to the $KMnO_4$ is less than or equal to 3:2, the amount of the $KMnO_4$ is sufficient for reacting with the total amount of the $MnCO_3$. Therefore, for forming the $MnO_2$ hollow spheres, the reaction time between the $KMnO_4$ and the $MnCO_3$ should be controlled to avoid reactions with the center of the $MnCO_3$ solid spheres. The reaction time can be controlled by timing the addition of the dilute acid into the reaction product. The dilute acid can react with $MnCO_3$. Therefore, the dilute acid can be added into the reaction product before the center of the $MnCO_3$ solid spheres reacted with the $KMnO_4$. The timing for adding the dilute acid into the reaction product can be at a time less than or equal to about 6 minutes after introducing the $KMnO_4$. That is, the dilute acid can be added into the reaction product after introducing the $KMnO_4$ solution for less than or equal to about 6 minutes.

If the molar ratio of the $MnCO_3$ to the $KMnO_4$ is larger than 3:2, the amount of the $KMnO_4$ is insufficient for reacting with the total amount of the $MnCO_3$. Therefore, there is no need to control the reaction time between the $KMnO_4$ and the $MnCO_3$. The mixture of the $KMnO_4$ solution and the $MnCO_3$ water solution can be sufficiently stirred to completely react the $KMnO_4$ with the $MnCO_3$ solid spheres. Further, the molar ratio of the $MnCO_3$ to the $KMnO_4$ can be further increased to control the wall thickness of the achieved $MnO_2$ hollow spheres. Thereby, the wall thickness of the spinel $LiMn_2O_4$ hollow spheres can also be controlled. The greater the molar ratio of the $MnCO_3$ to the $KMnO_4$, the smaller the wall thickness.

In step S14, the dilute acid can be one or more of dilute sulfuric acid, dilute hydrochloric acid, and dilute nitric acid. The dilute acid is used to dissolve the $MnCO_3$ not reacted with the $KMnO_4$ at the center of the $MnCO_3$ solid sphere, thereby forming the $MnO_2$ hollow sphere. The amount of the dilute acid can be excessive to sufficiently react with the $MnCO_3$. The reaction time of the dilute acid can range from about 1 minute to about 10 minutes.

Further, after the step S14, the $MnO_2$ hollow spheres can be separated from the mixture by a filtration method or centrifugation. The $MnO_2$ hollow spheres can be washed by distilled water several times and dried, to improve the purity.

In one embodiment, the $MnO_2$ hollow spheres are synthesized by steps of: dispersing 0.1 g $MnCO_3$ powder into 20 ml water; introducing 0.16 mmol $KMnO_4$ to react for about 6 minutes; adding 0.05 mmol dilute nitric acid to react for about 1 minutes; centrifugating the solid product; and washing and drying the solid product to achieve the $MnO_2$ hollow sphere. It is to be understood that, more $MnO_2$ hollow spheres can be achieved by increasing the added amount of the $MnCO_3$ powder and the $KMnO_4$ at the molar ratio of the $MnCO_3$ to the $KMnO_4$ in the range of $1:1 \leq Mol_{MnCO3}:Mol_{KMnO4} \leq 10:1$.

In step S2, the material of the lithium source powder can be at least one of lithium hydroxide (LiOH) and commonly used lithium salt for cathode active material preparation, such as lithium carbonate ($Li_2CO_3$), lithium chloride (LiCl), lithium nitrate, lithium oxalate, lithium phosphate, lithium hydrogen phosphate, or lithium dihydrogen phosphate ($LiH_2PO_4$). In one embodiment, the lithium source powder is nanoscale in size.

The lithium source powder and the $MnO_2$ hollow spheres can be mixed at room temperature. A molar ratio of Li element of the lithium source powder to Mn element of the $MnO_2$ hollow sphere can be in a range from about 1:1 to about 5:1 ($1:1 \leq Mol_{Li}:Mol_{Mn} \leq 5:1$). The added amount of the liquid medium can be set to provide a relatively good mobility of the mixture, without being too excessive, which may result in a long drying period. The liquid medium can be enough of an amount to obtain a paste of the mixture with relatively low viscosity. In one embodiment, a ratio of a total volume of the lithium source powder and the $MnO_2$ hollow spheres to a volume of the liquid medium ranges from about 1:1 to about 1:5. In one embodiment, the ratio of the total volume of the lithium source powder and the $MnO_2$ hollow spheres to the volume of the liquid medium is about 1:2. The liquid medium is easy to evaporate and remove. The liquid medium can be ethanol, isopropyl alcohol, or acetone, which does not react with the lithium source powder or dissolve the $MnO_2$ hollow spheres. In one embodiment, the liquid solvent is ethanol.

By using the liquid medium, the lithium source powder can be uniformly mixed with the $MnO_2$ hollow spheres to avoid the segregation, aggregation, and great difference among different preparation times. The manganese dioxide hollow spheres and the lithium source powder are both in solid state in the liquid medium.

The lithium source powder and the $MnO_2$ hollow spheres can be mixed while maintaining the shape of $MnO_2$ hollow spheres. More specifically, during the mixing of the $MnO_2$ hollow spheres with the lithium source powder in the liquid medium, a soft mixing method can be used to avoid damaging the shape of the $MnO_2$ hollow spheres. For example, $MnO_2$ hollow spheres and the lithium source powder can be ultrasonically agitated or magnetically stirred in the liquid medium. The magnetic stirring can last from about 1 hour to about 3 hours. To achieve the $LiMn_2O_4$ hollow spheres, the mixing methods of ball milling and grinding can be avoided.

In step S3, the mixture can be dried in an oven to completely remove the liquid medium. If the liquid solvent is ethanol, the mixture can be dried at a temperature of about 60° C. to about 80° C. The drying time is related to the amount of the liquid medium. In one embodiment, the drying time is about 1 hour to about 3 hours to totally remove the liquid medium. It is to be understood that, the mixture can also be dried at room temperature.

In step S4, the precursor can be sintered in air in a muffle furnace. During the sintering, the precursor is directly elevated to the sintering temperature, and then sintered at the sintering temperature for a predetermined time. In one embodiment, the sintering temperature is about 600° C. to about 800° C. The sintering time is related to the amount of precursor. Before sintering, the temperature of the precursor is uniformly and slowly elevated to the sintering temperature, in a period of time of about 3 hours to about 4 hours. In one embodiment, the weight of the precursor is about 30 g, the temperature is elevated from room temperature to the sintering temperature for about 4 hours, the sintering temperature is about 750° C., and the sintering time is about 3 hours.

Figure 3:
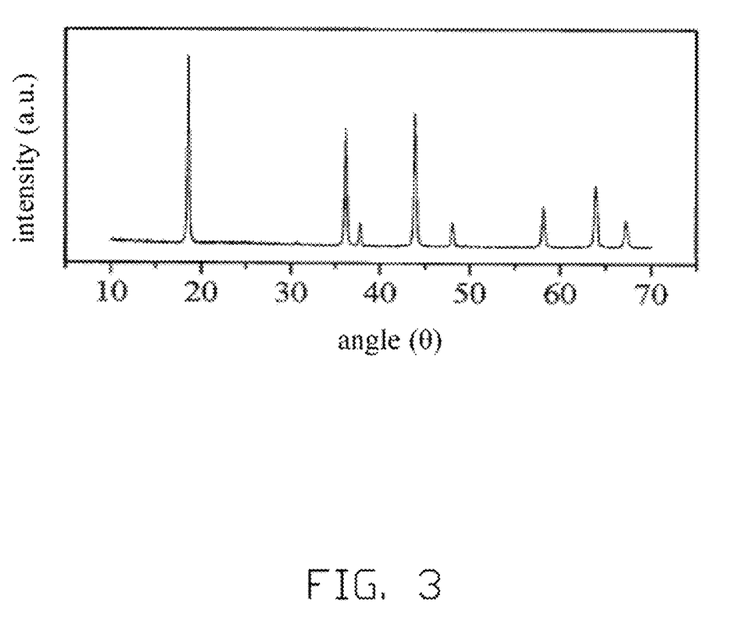
FIG. 3 is a graph showing an X-ray diffractometry (XRD) of the prepared spinel $LiMn_2O_4$ cathode active material.
Figure 4:
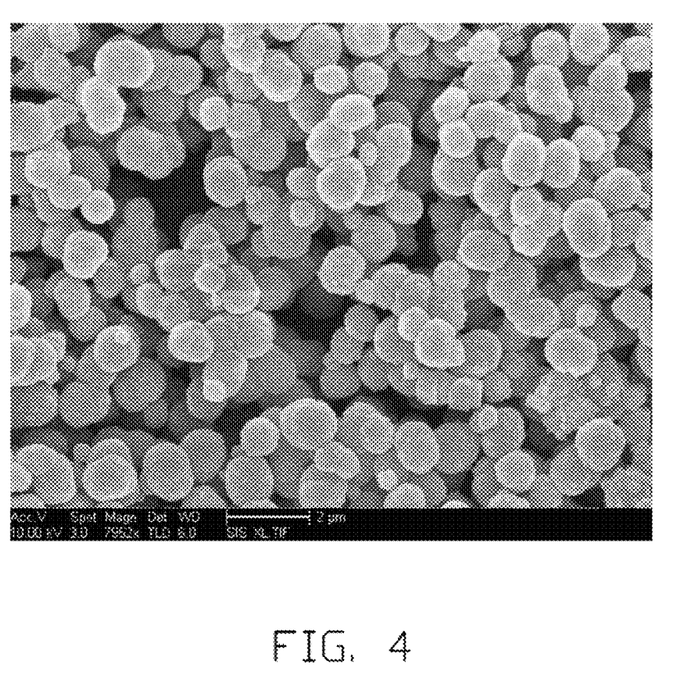
FIG. 4 is a photo showing a Scanning Electron Microscope (SEM) image of the prepared spinel $LiMn_2O_4$ cathode active material.
Figure 5:
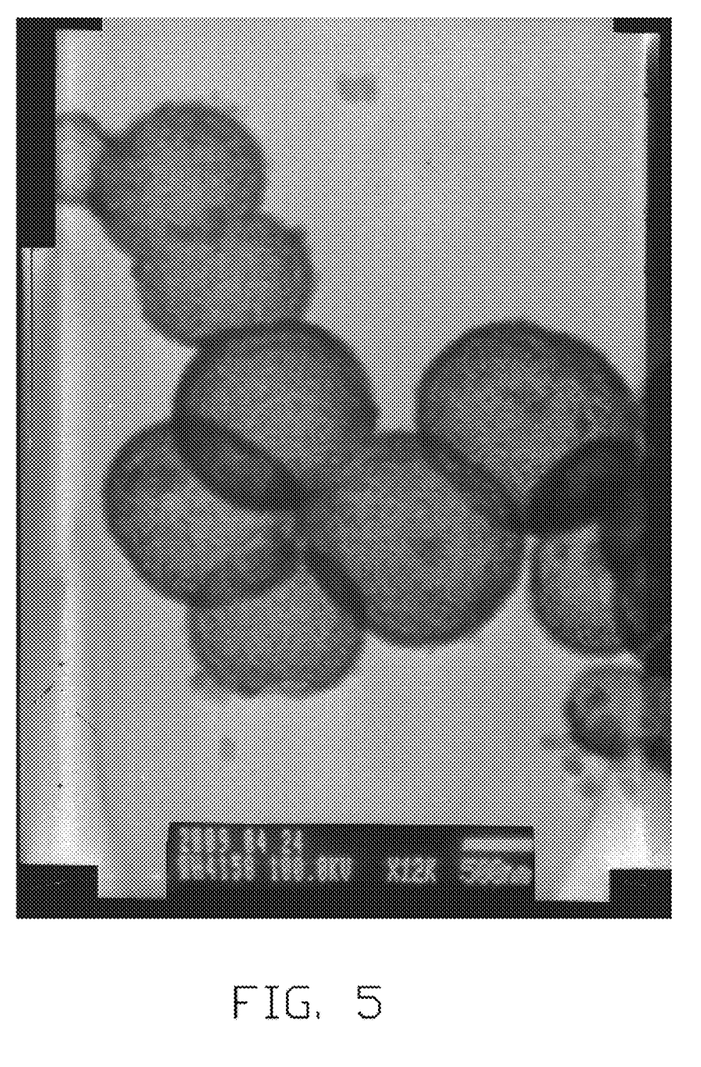
FIG. 5 is a photo showing a Transmission Electron Microscope (TEM) image of the prepared spinel $LiMn_2O_4$ cathode active material.

Referring to FIG. 3, the XRD pattern indicates that spinel $LiMn_2O_4$ with relatively high purity has been obtained by the above described method. Referring to FIG. 4 and FIG. 5, the obtained $LiMn_2O_4$ has the same hollow sphere shape as the $MnO_2$ hollow spheres. Therefore, during steps S2 and S3, the shape of $MnO_2$ hollow spheres has been well maintained. Further, for the reason that, in step S4, the single sintering step is used by elevating the temperature of the precursor directly from room temperature to the sintering temperature at uniform speed, the reaction process of the $MnO_2$ hollow spheres with the lithium source powder to form the $LiMn_2O_4$ does not change the shape of the $MnO_2$ hollow spheres. Accordingly, the spinel $LiMn_2O_4$ hollow spheres can be achieved based on the shape of the $MnO_2$ hollow spheres. A diameter of the spinel $LiMn_2O_4$ hollow spheres can be less than 10 microns. In one embodiment, the diameter of the spinel $LiMn_2O_4$ hollow spheres is in a range from about 1 micron to about 2 microns.

Figure 6:
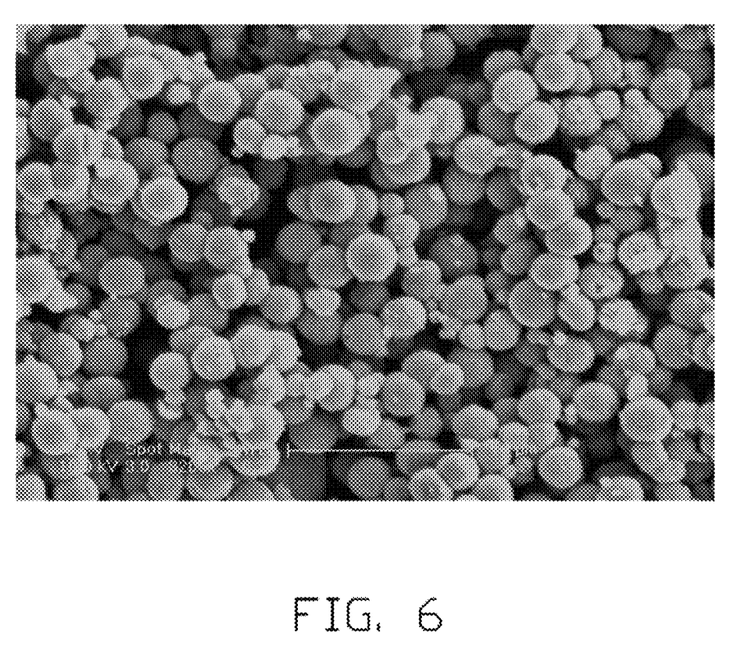
FIG. 6 is a photo showing an SEM image of compared spinel $LiMn_2O_4$ solid spheres.
Figure 7:
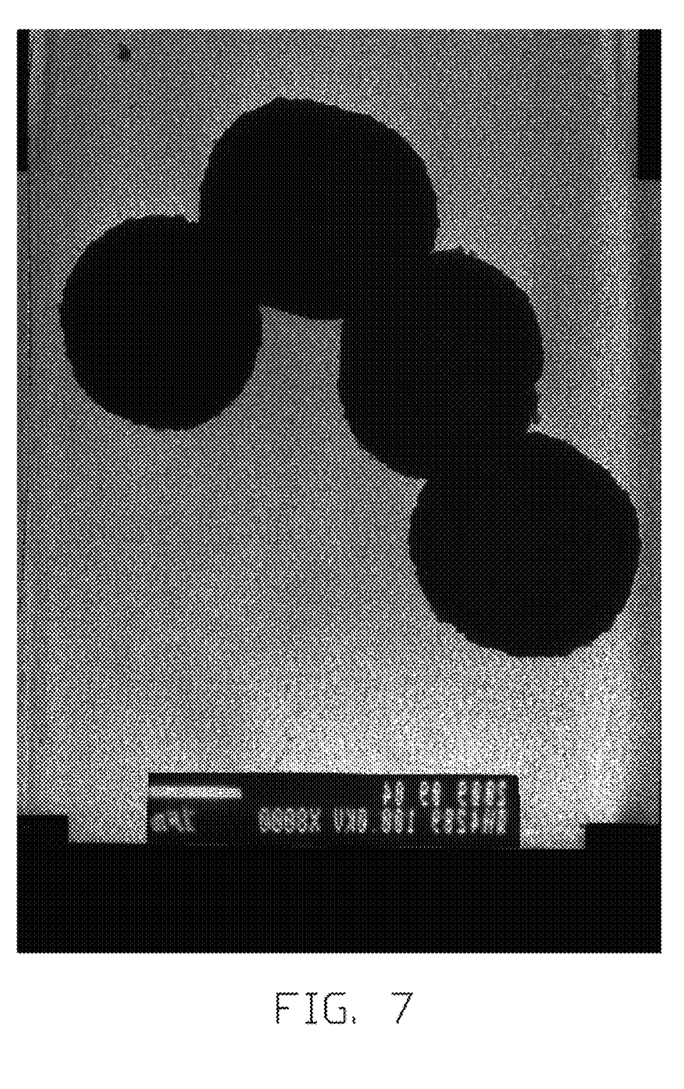
FIG. 7 is a photo showing an TEM image of the compared spinel $LiMn_2O_4$ solid spheres.

To compare with the spinel $LiMn_2O_4$ hollow spheres, a sample of spinel $LiMn_2O_4$ solid spheres is formed by a method including synthesizing the $MnCO_3$ solid spheres by the steps S11 to S14, and reacting the $MnCO_3$ solid spheres with the lithium source powder according to the steps S2 through S4 by replacing the $MnO_2$ hollow spheres with the $MnCO_3$ solid spheres. Referring to FIG. 6 and FIG. 7, the spinel $LiMn_2O_4$ solid spheres have similar structure as the spinel $LiMn_2O_4$ hollow spheres, but have a solid center.

Figure 8:
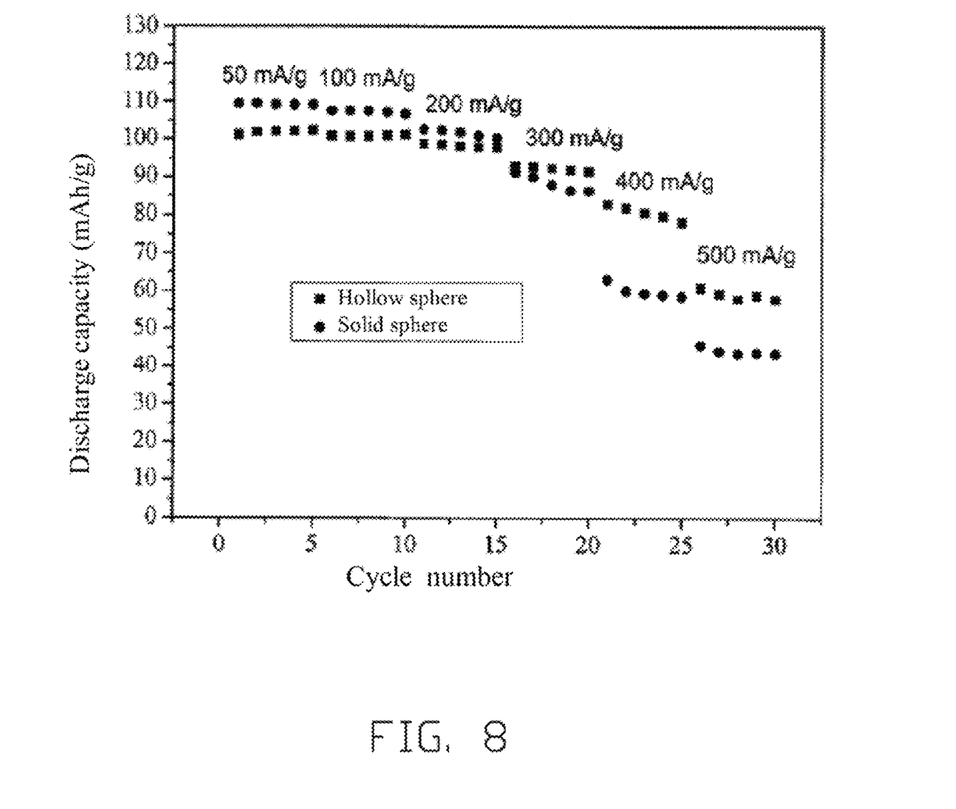
FIG. 8 is a graph comparing specific capacities of lithium batteries using cathodes respectively including the prepared spinel $LiMn_2O_4$ cathode active material and the compared spinel $LiMn_2O_4$ solid spheres at different discharge current rates.

Referring to FIG. 8, two kinds of lithium ion batteries are fabricated by respectively using the spinel $LiMn_2O_4$ hollow spheres and the spinel $LiMn_2O_4$ solid spheres as the cathode active material. The other parts of the two kinds of lithium ion batteries and the testing conditions are the same. The two kinds of lithium ion batteries are cycled at different charge/discharge current rates, which are represented by different current densities: 50 mA/g, 100 mA/g, 200 mA/g, 300 mA/g, 400 mA/g, and 500 mA/g. When the two kinds of lithium ion batteries are cycled at smaller current densities, such as 50 mA/g to 200 mA/g, the discharge specific capacities thereof are almost the same. However, when the current density is increased to 400 mA/g or 500 mA/g, the lithium ion battery using the spinel $LiMn_2O_4$ hollow spheres has a much larger discharge specific capacity than the lithium ion battery using the spinel $LiMn_2O_4$ solid spheres. The spinel $LiMn_2O_4$ hollow spheres have a better high rate performance than the spinel $LiMn_2O_4$ solid spheres.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for preparing a lithium manganese oxide cathode active material, the method comprising:
   providing a plurality of first hollow spheres made of manganese dioxide and a lithium source powder;
   mixing the plurality of first hollow spheres and the lithium source powder in a liquid medium to achieve a mixture, wherein the plurality of the first hollow spheres and the lithium source powder are both in solid state in the mixture, and a ratio of a total volume of the lithium source powder and the plurality of first hollow spheres to a volume of the liquid medium is from about 1:1 to about 1:5 in the mixture;
   drying the mixture to remove the liquid medium, thereby achieving a precursor; and
   sintering the precursor at a sintering temperature of about 600° C. to about 800° C. for about 3 hours to about 10 hours, to achieve a plurality of second hollow spheres made of lithium manganese oxide.

2. The method of claim 1, wherein the liquid medium is ethanol, a material of the lithium source powder is selected from the group consisting of lithium hydroxide, lithium carbonate, and a combination thereof.

3. The method of claim 1, wherein the plurality of first hollow spheres are prepared by following steps:
   providing an amount of manganese carbonate powder;
   dispersing the amount of manganese carbonate powder into water to form a manganese carbonate water solution;
   introducing a potassium permanganate solution into the manganese carbonate water solution while stirring the manganese carbonate water solution to form a reaction product; and
   adding a dilute acid into the reaction product.

4. The method of claim 3, wherein the manganese carbonate powder is a plurality of manganese carbonate solid spheres.

5. The method of claim 4, wherein a molar ratio of the plurality of manganese carbonate solid spheres to the potassium permanganate is from about 1:1 to about 10:1.

6. The method of claim 3, wherein the dilute acid is selected from the group consisting of dilute sulfuric acid, dilute hydrochloric acid, dilute nitric acid, and combinations thereof.

7. A method for preparing a lithium manganese oxide cathode active material, the method comprising:
   providing a plurality of first hollow spheres made of manganese dioxide and a lithium carbonate;
   mixing the plurality of first hollow spheres and the lithium carbonate in a ethanol in room temperature to achieve a mixture, wherein the plurality of the first hollow spheres and the lithium carbonate are both in solid state in the mixture, and a ratio of a total volume of the lithium carbonate and the plurality of first hollow spheres to a volume of the liquid medium is from about 1:1 to about 1:5 in the mixture;
   drying the mixture to remove the liquid medium, thereby achieving a precursor; and
   sintering the precursor at a sintering temperature of about 600° C. to about 800° C. for about 3 hours to about 10 hours, to achieve a plurality of second hollow spheres made of lithium manganese oxide.

8. The method of claim 7, wherein the plurality of first hollow spheres are prepared by following steps:

providing an amount of manganese carbonate powder;

dispersing the amount of manganese carbonate powder into water to form a manganese carbonate water solution;

introducing a potassium permanganate solution into the manganese carbonate water solution while stirring the manganese carbonate water solution to form a reaction product; and adding a dilute acid into the reaction product.

9. The method of claim 8, wherein the manganese carbonate powder is a plurality of manganese carbonate solid spheres.

10. The method of claim 9, wherein a molar ratio of the plurality of manganese carbonate solid spheres to the potassium permanganate is from about 1:1 to about 10:1.

11. The method of claim 8, wherein the dilute acid is selected from the group consisting of dilute sulfuric acid, dilute hydrochloric acid, dilute nitric acid, and combinations thereof.

* * * * *